UNITED STATES PATENT OFFICE.

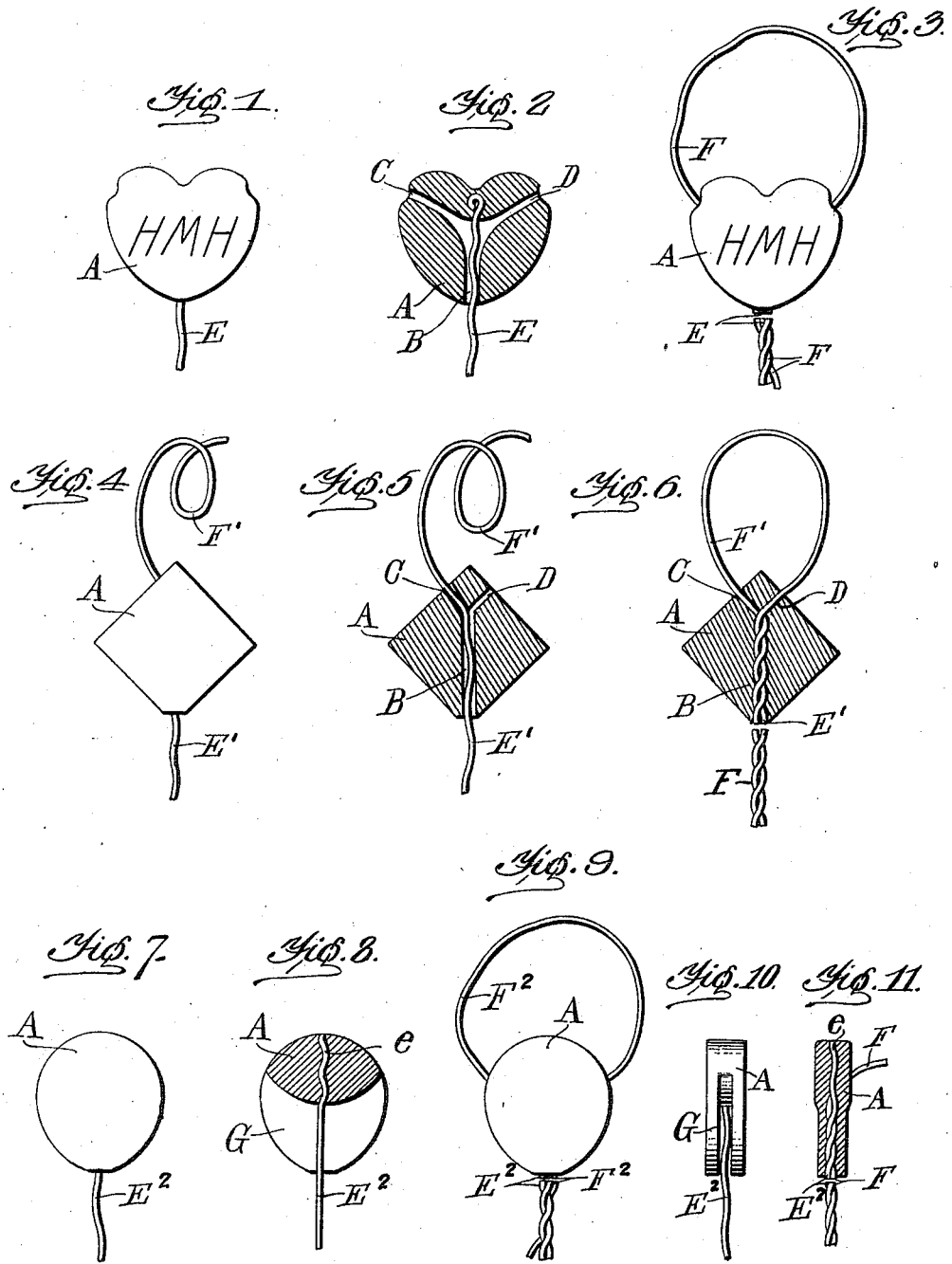

JOHN L. DINSMOOR, OF BROOKLYN, NEW YORK, ASSIGNOR OF ONE-HALF TO HERMANN M. HIRSCHBERG, OF NEW YORK, N. Y.

SEAL.

998,879. Specification of Letters Patent. Patented July 25, 1911.

Application filed July 9, 1906, Serial No. 325,308. Renewed June 8, 1910. Serial No. 565,872.

*To all whom it may concern:*

Be it known that I, JOHN L. DINSMOOR, a citizen of the United States, residing at Brooklyn, in the county of Kings and State of New York, have invented certain new and useful Improvements in Seals, of which the following is a specification.

My invention is a seal adapted for use on electric meters, measuring instruments, car doors, and in any other art or relation where it is desirable to use a device of this character.

My object is to produce a simple, compact and cheap construction whereby a seal may be attached easily and quickly to any suitable or preferred apparatus without requiring the use of special tools, such as a "seal press," or a stamp, die or punch, commonly employed in connection with ordinary seals made of soft lead or similar yieldable material. The new seal of my invention may be inspected to ascertain whether it has been tampered with in an unwarranted manner, such inspection of the seal being accomplished without prying open the body of the seal or otherwise disturbing either the body or the wire strand or strands. Furthermore, the seal is not affected by a conflagration in a building in which may be located the meter or other apparatus. Furthermore, the seal is capable of application to a meter or other apparatus without destroying or affecting the ornamental character of the seal-body, thus making it possible to employ seals which bear a distinguishing mark of the user.

Broadly stated, the invention consists of a chambered seal-body and one or more strands adapted to be twisted within the seal-body, said strand or strands, or one of them, being permanently united with said body.

It is preferred to make the seal-body of non-yieldable material, such as cast metal other than soft lead, glass, or a hard fireproof composition; said body being cast or molded in the required shape and size, and the strand or strands, or only one of them, being embedded in, or permanently united to, the body in the course of manufacturing the seal.

The invention may be embodied in different practical forms to meet the requirements of the user, and in such practical forms of the invention I hold myself at liberty to employ either one, two or more wires in connection with the seal-body, one wire being held by me to be the equivalent of two separate wires when the parts are combined and organized so as to produce a plurality of strands adapted to be twisted within a chambered seal-body, one of said strands being adapted to serve as a shackle by which the seal may be attached to a meter, car door, or other structure to which it is desired to apply the seal.

In the drawings, Figures 1, 2 and 3 represent one practical embodiment of the invention wherein I employ two wires in connection with a seal-body; Figs. 1 and 2 being a side elevation and a section, respectively, before the attachment of a tie wire, and Fig. 3 being an elevation of the seal in the condition of the parts subsequent to application of said seal. Figs. 4, 5 and 6 are, respectively, a side elevation, a section before application to a meter or other apparatus, and a section subsequent to such application, showing another practical form of the seal wherein I employ a single wire which is so combined with the seal body as to produce a plurality of strands which on the application of the seal are adapted to be twisted and housed within the body thereof. Figs. 7, 8 and 9 are, respectively, a side elevation of the seal before application to an apparatus, a section, and a side elevation after application, said means showing a construction which may be used to good advantage in sealing a car door. Fig. 10 is an edge view in elevation of the seal shown by Figs. 7 and 8. Fig. 11 is a cross-section through the seal subsequent to application thereof to an apparatus substantially as shown by Figs. 3, 6 and 9.

The body A of the seal is preferably composed of a single piece of material. This body may be of the different shapes shown by Figs. 1, 4 and 7, or of any other suitable or preferred shape, and it may be made to embody the distinguishing mark or characteristic form of a symbol, emblem or other device employed by the user of the seal. The size and proportions of the body will be changed to suit the apparatus on which the seal is to be employed; for example, when used on electrical meters and measuring instruments, a small body will be employed; but it is evident that for sealing car doors, I may substantially enlarge the seal body.

While I may employ soft lead or like material in the manufacture of the seal body when the seal is to be used in certain relations, for many reasons I prefer to employ a non-yieldable or a substantially non-compressible material in making said body.

It is well known that the security and efficiency of the commercial or common forms of soft lead seals to be found on the market depend upon the compression or squeezing of the material upon or around a wire shackle in one manner or another. While the disadvantages of such soft lead seals are appreciated by the users thereof, it is desired to here call attention to the facts that seals of said class require special tools, such as presses, dies, stamps or punches when applying them to meters, car doors and other apparatuses; that subsequent to the application of the seal the body thereof can be pried open, so that the seal may be detached and replaced practically without detection; and that the soft-lead body is fusible under a comparatively low degree of heat, which results in the destruction of the seal in event of a conflagration. My new seal, however, does not depend for its security upon an intimate engagement of the body with the shackle such as is obtained by compressing a soft lead body upon or around the shackle. For the purposes of my invention, the body A is made of a relatively hard substance or material, such as cast iron or steel, brass, or other metal; and for some purposes I have found that glass is well adapted for the seal body, particularly as the glass permits the seal to be easily and quickly inspected to ascertain whether the shackle strand or wire is intact and complete.

In the form of construction shown by Figs. 1, 2 and 3, the body A is provided with a chamber or passage B, and with inclined or curved passages C, D, the latter passages being shown as converging and opening into the passage or chamber B. The passages C, D, are shown as opening through the edge of the body A at the respective sides thereof, at or near the upper portion, while the passage B opens through the lower edge, but this arrangement is not essential. A wire, strand, or pliable member E is attached permanently to the body A, preferably at a point between the converging passages C, D, see Fig. 2, and said part E extends loosely through the passage B. The seal as it is intended to be placed on the market consists of the body A and the member E, but to complete the seal, I provide the wire, strand or member F, the latter serving the purposes of a shackle whereby the seal is adapted to be attached to a meter, car door, or other structure.

In applying the seal to a meter, or any other apparatus, the shackle member or wire F is passed through an eye, staple, or other part, and the respective ends of the shackle member or strand F are slipped or passed through the passages C, D, so as to extend through the passage B, whereby the two end portions of the shackle member F are alongside of the member E. To complete the application or adjustment of the seal, the operator is not required to use a press, die, or other device for compressing the body A upon the members or strands E, F; but, on the contrary, the operator uses an ordinary pliers for twisting the members or strands E, F, together, after which the protruding twisted portions of the members or strands are cut off, as shown in Fig. 3. This completes the operation, and the seal is applied securely by the twisted portion of the members E, F, being housed within the body A, in the chamber B thereof.

Another practical form of the invention is shown by Figs. 4, 5 and 6, wherein I employ a single wire to produce a plurality of strands adapted to be twisted within the body. As shown, the body A has the passages or chambers B, C, D, and the continuous member or wire $E'$, $F'$, fits partially in the passages B, C. Said member or wire is secured or united at a point intermediate of its length permanently to the body A, preferably in the passage C, by securing the member in the material composing said body around the member, the latter completely filling the passage C. The continuous wire or member $E'$, $F'$, extends at its respective ends beyond the opposite sides of the body so as to produce a plurality of strands, see Figs. 4 and 5. To apply the seal, the pliable shackle member $F'$ is fitted in the eye or staple of an apparatus and then slipped through the passages D, B, after which the shackle member, $F'$, and the pliable strand or member, $E'$, are twisted together and the protruding twisted portion cut off, see Fig. 6, thus leaving a twisted portion of the strand, $E'$, and the shackle member, $F'$, housed within the chamber B of the seal body.

Still another practical construction embodying my invention is shown by Figs. 7 to 10, inclusive, wherein I have simplified the body A by substituting for the passages B, C, D, a single recess, slot or chamber G. Said body is cast or molded with the chamber G extending continuously from side to side so as to open through the bottom edge and two side edges, see Figs. 8 and 10, the upper portion of the body being solid. A pliable member $E^2$ is permanently united with the body A by embedding the same, as at $e$, in the solid portion of said body during the operation of molding or casting the latter, said member $E^2$ extending across the chamber G, as shown. A shackle member or strand $F^2$ engages an eye, staple or other part of an apparatus to be sealed, and the respective end portions of this shackle member F² are fitted in the recess G of the body A, the adjacent parts of the strand E² and the shackle member F² being twisted together so that the twisted portions are received in the recess or chamber G, the protruding twisted part of the strands being cut off, as in Figs. 9 and 11. The construction just described produces a desirable seal for car doors, and large apparatuses. By using a body A of the proper size, and by employing comparatively heavy or thick wires as the members E², F², a substantial and strong device is provided which may serve as both a seal and a lock, thus dispensing with a separate seal and a lock for car doors.

As heretofore stated, the seal body may be composed of material, such as soft lead, adapted to be compressed upon the plurality of strands subsequently to the operation of twisting them together, although it is preferred to employ non-compressible material in the manufacture of said seal body. In Fig. 11 I have shown the seal body, A, compressed into engagement with the united strands, E², F².

This invention possesses many advantages over the common form of soft lead seals. The article can be manufactured cheaply and quickly because it is only necessary to cast or mold the body and at the same time, or subsequently to casting, unite the pliable member or members to said body. The seal can be easily applied with the aid of common pliers or nippers, it only being necessary to twist the ends of the pliable members and cut off the protruding twisted end portions of said members. Ready inspection of the seal is possible because the body can be viewed edgewise to ascertain whether the twisted part of the pliable members are complete and intact, the loop-shaped part of the shackle members F, F¹, F² being always visible. By making the body of glass, or other non-yielding transparent or translucent material, inspection of the seal is facilitated. The seal-body may be of an ornamental character, or it may be molded or cast with the distinguishing mark of the owner or user, the seal being applied without disfiguring or defacing the body and the ornamentation thereof. The device is practically fireproof, that is, it will not fuse under the heat generated by a conflagration; in fact, the body may be made of a non-combustible material or compound adapted to be molded or otherwise produced in the required form whereby it may be combined with the strand or strands.

By the use of the term strands or pliable members in the annexed claims I desire to be understood as intending to embrace pliable members which are or may be composed of one piece of wire adapted to form a plurality of pliable members to be twisted together, or a number of pieces of separate pliable material adapted to be twisted together; the function and result attained being the same whether one piece or more than one piece of pliable material is employed.

When two separate pieces of pliable material, such as wire, are employed as in Figs. 1, 2, 3, and 7, 8, 9, 10 and 11, the part, E or E², may for convenience be designated as a tie-member, whereas the other part, F or F², can be appropriately designated as the shackle member. Furthermore, when the members are composed of one piece of material, as in Figs. 4, 5, and 6, the part, E′, extending through the passage, B, of the seal body may be designated as the tie-member, whereas the other part, F′, may be designated as the shackle member, for the reason that said part F′, is adapted to be formed into a loop and to extend through the passages, D, B, so as to be twisted with the member, E′. From the generic standpoint of the invention, it is immaterial whether the tie-member is made in one piece with the shackle member or is made separately from the shackle member, so long as at least one of said members is united permanently to the seal body, and the two members are adapted to be twisted to each other within said seal body.

Having thus described my invention, what I claim as new and desire to secure by Letters Patent is:—

1. In a seal, a body composed of non-compressible material, and a plurality of members, one of which is secured permanently within the body, said members being adapted to be twisted to each other wholly within the body, and one member being looped to serve as a shackle.

2. In a seal, a body provided with an opening, extending therethrough from one side to the other side thereof, and a plurality of pliable members, one of which is secured permanently within the body, said members being adapted to be twisted to each other within the opening of the body at the time the seal is applied, one of said members being looped to serve as a shackle.

3. In a seal, a body provided with an opening, and a plurality of pliable members one of which is secured permanently within the body, one of said members being looped externally with respect to the body and serving the purposes of a shackle, the said members being twisted together within the opening of the body, and the united ends of said members being severed substantially flush with the body subsequent to the application of the seal.

4. In a seal, a body provided with an opening, and a plurality of pliable members, one of which is adapted to serve as a shackle member and the other as a tie-member, said members being adapted to be twisted together wholly within said opening of the body and at least one of them being secured permanently within the body.

5. In a seal, a body provided with an opening, and a plurality of pliable members, one of which is secured directly in the material composing the body, one of said members being positioned externally of the body to serve as a shackle, the member which is secured in the body passing loosely through the opening thereof, both of said members having free ends, which ends are adapted to be twisted together and within said opening of the body.

6. In a seal, a body composed of non-compressible material, and a plurality of pliable members, one of which is secured permanently in the body and extends freely through a space therein, the other member being adapted for insertion into the body to a position alongside the free portion of the aforesaid permanently secured member therein, said free portions of the pliable members being capable of union with each other by twisting them together within said body.

7. In a seal, a body composed of non-compressible material and provided with an opening, and a plurality of pliable members, one of which is secured permanently in the body, said secured member extending through said opening to a point outside of the body, the other of said pliable members serving the purpose of a shackle, said members being adapted to be twisted together independently of the attachment of either of said members to the body.

8. In a seal, a body provided with an opening which extends through the same substantially from one side thereof to the other, and a plurality of members, one of which forms a shackle, said members having free end portions adapted to be twisted together and within the opening of said body, one of said members being held from movement relative to the material comprising the body under a pull or strain on said member.

9. In a seal, a body provided with an opening, and a plurality of pliable members formed by a piece of wire which is secured directly in the material composing the body, one of said members serving as a shackle and the other member extending through the aforesaid opening, both members having free ends adapted to be twisted together within said opening of the body.

10. In a seal, a body composed of non-compressible material and provided with an opening or passage which extends through the body, and a plurality of pliable members formed by a piece of wire which is secured permanently, at a point intermediate its ends, to the material of the body, one of said ends serving as a shackle member and the other as a tie-member, said ends being twisted to each other within the body when the seal is applied.

11. In a seal, a body having an opening extending through the same, and a plurality of members adapted to extend through said opening, one of said members being disconnected from the other member prior to twisting the members together, and said twisted parts of the members being incased wholly within the body.

12. In a seal, a body composed of non-compressible material and having an opening extending through the same, and a plurality of members, one of which is normally in the opening, and protrudes beyond one side of the body, the other member being insertible in said opening through the opposite side of the body, said inserted end of the second named member being adapted to be twisted with the first named member, whereby the two members are united to each other independently of the connection of either member to the body.

13. In a seal, a non-compressible body having an opening extending through the same, and a plurality of pliable members, one of which is free or disconnected for practically its length and positioned within said opening, the other member being insertible in the opening and adapted to be twisted with the free portion of the member positioned within said opening of the body, whereby the pliable members are united to each other independently of the attachment of either member to the body.

14. In a seal, a body provided with an opening, and a plurality of members adapted to be twisted together, said twisted part of the members being contained wholly within said opening, one of said members being held from lengthwise movement by permanently attaching it to said body.

In testimony whereof I have signed my name to this specification in the presence of two subscribing witnesses.

JOHN L. DINSMOOR.

Witnesses:
  H. T. BERNHARD,
  V. E. NICHOLS.

---

Copies of this patent may be obtained for five cents each, by addressing the "Commissioner of Patents, Washington, D. C."